US012447220B2

(12) United States Patent
Karlicek, Jr. et al.

(10) Patent No.: US 12,447,220 B2
(45) Date of Patent: Oct. 21, 2025

(54) UVC IRRADIATION DISINFECTION SYSTEMS AND METHODS

(71) Applicant: Rensselaer Polytechnic Institute, Troy, NY (US)

(72) Inventors: Robert F. Karlicek, Jr., Mechanicville, NY (US); Mohammed Alnaggar, Niskayuna, NY (US); Arunas Tuzikas, Yorktown, VA (US)

(73) Assignee: Rensselaer Polytechnic Institute, Troy, NY (US)

( * ) Notice: Subject to any disclaimer, the term of this patent is extended or adjusted under 35 U.S.C. 154(b) by 359 days.

(21) Appl. No.: 17/920,198

(22) PCT Filed: Apr. 20, 2021

(86) PCT No.: PCT/US2021/028123
§ 371 (c)(1),
(2) Date: Oct. 20, 2022

(87) PCT Pub. No.: WO2021/216527
PCT Pub. Date: Oct. 28, 2021

(65) Prior Publication Data
US 2023/0201388 A1 Jun. 29, 2023

Related U.S. Application Data

(60) Provisional application No. 63/012,593, filed on Apr. 20, 2020.

(51) Int. Cl.
*A61L 2/10* (2006.01)
*A61L 2/24* (2006.01)

(52) U.S. Cl.
CPC ...... *A61L 2/10* (2013.01); *A61L 2/24* (2013.01); *A61L 2202/24* (2013.01); *A61L 2202/26* (2013.01)

(58) Field of Classification Search
CPC ..... A61L 2/10; A61L 2/24; A61L 2/08; A61L 2202/24; A61L 2202/26
See application file for complete search history.

(56) References Cited

U.S. PATENT DOCUMENTS 8,203,124 B2   6/2012   Havens et al.
10,485,888 B2  11/2019  Schmidt et al.
(Continued)

FOREIGN PATENT DOCUMENTS

WO   2018175514 A2   9/2018

OTHER PUBLICATIONS

International Search Report and the Written Opinion of the International Searching Authority, International Application No. PCT/US2021/028123, mailed Aug. 5, 2021.
(Continued)

*Primary Examiner* — David E Smith
(74) *Attorney, Agent, or Firm* — Barclay Damon LLP; Anthony P. Gangemi

(57) ABSTRACT

A disinfection system includes a first UVC radiation source and a second opposing UVC radiation source. The first and second UVC radiation sources are positioned such that a gap exists therebetween. The first UVC radiation source is configured to emit UVC radiation across the gap toward the second UVC radiation source and the second UVC radiation source is configured to emit UVC radiation across the gap toward the first UVC radiation source. A vertically-oriented conveyor system is partially positioned in the gap. The vertically-oriented conveyor system includes a plurality of upper sprockets connected by an upper track, a plurality of lower sprockets connected by a lower track, at least one vertical band connected to the upper track and the lower track, and a motor configured to simultaneously drive the upper track and the lower track such that the at least one (Continued)

vertical band is translated through the gap between the first and second UVC radiation sources. At least one medical garb is mounted to the at least one vertical band such that when the at least one vertical band is translated through the gap an outer surface of the at least one medical garb is exposed to UVC radiation emitted from the first UVC radiation source and an inner surface of the at least one medical garb is exposed to UVC radiation emitted from the second UVC radiation source.

22 Claims, 4 Drawing Sheets

(56) References Cited

U.S. PATENT DOCUMENTS

| | | |
|---|---|---|
| 10,842,896 B1 | 11/2020 | Mehra et al. |
| 2007/0012340 A1 | 1/2007 | Jones et al. |
| 2008/0067417 A1 | 3/2008 | Lane et al. |
| 2010/0127189 A1 | 5/2010 | Boyarsky et al. |
| 2016/0008499 A1* | 1/2016 | Sunkara ............... A61B 90/98 422/24 |
| 2018/0343898 A1* | 12/2018 | Alzeer ................. A23B 2/001 |
| 2019/0134242 A1 | 5/2019 | Bonutti et al. |

OTHER PUBLICATIONS

Prescientx Terminator CoV N95 Mask Disinfection System, Mar. 28, 2020.

* cited by examiner

UVC IRRADIATION DISINFECTION SYSTEMS AND METHODS

CROSS REFERENCE TO RELATED APPLICATION(S)

This application claims the benefit of U.S. Provisional Patent Application No. 63/012,593, filed Apr. 20, 2020, which is incorporated by reference as if disclosed herein in its entirety.

FIELD

The present technology generally relates to disinfection systems. More particularly, the present technology relates to devices, systems, and methods for disinfecting personal protective equipment, such as medical masks.

BACKGROUND

Ultraviolet-C ("UVC") radiation (light having a wavelength in the range of 200 nm to 280 nm) is well known for its germicidal properties related to its ability to kill microbes and deactivate viruses. UVC radiation is particularly effective for the disinfection of personal protective equipment ("PPE") and filtering facepiece respirators ("FFR"), such as the N95 mask commonly used in hospitals. However, UVC radiation is a line-of-sight disinfection system, and PPE, particularly FFR, have many shadowed surfaces due to folds and bunching of the material. Thus, pathogens existing on the shadowed surfaces are shielded from the UVC radiation and remain viable after UVC radiation exposure.

Therefore, there is a need for an improved UVC radiation exposure system having reduced shadowing and improved disinfection efficacy.

SUMMARY

Accordingly, one embodiment of the present technology is directed to a disinfection system. The disinfection system includes a first Ultraviolet-C ("UVC") radiation source and a second UVC radiation source opposing the first UVC radiation source. The first and second UVC radiation sources are positioned such that a gap exists therebetween. The first UVC radiation source is configured to emit UVC radiation across the gap toward the second UVC radiation source and the second UVC radiation source is configured to emit UVC radiation across the gap toward the first UVC radiation source. A vertically-oriented conveyor system is partially positioned in the gap. The vertically-oriented conveyor system includes a plurality of upper sprockets connected by an upper track, a plurality of lower sprockets connected by a lower track, at least one vertical band connected to the upper track and the lower track, and a motor configured to simultaneously drive the upper track and the lower track such that the at least one vertical band is translated through the gap between the first and second UVC radiation sources. At least one medical garb is mounted to the at least one vertical band such that when the at least one vertical band is translated through the gap an outer surface of the at least one medical garb is exposed to UVC radiation emitted from the first UVC radiation source and an inner surface of the at least one medical garb is exposed to UVC radiation emitted from the second UVC radiation source.

In some embodiments, the first UVC radiation source and the second UVC radiation source each includes at least one mercury vapor lamp.

In some embodiments, the first UVC radiation source and the second UVC radiation source each include a plurality of UVC light emitting diodes.

In some embodiments, the disinfection system further includes a frame supporting the first UVC radiation source, the second UVC radiation source, and the vertically-oriented conveyor system. The first and second UVC radiation sources are positioned at a first end of the frame.

In some embodiments, the disinfection system further includes a housing at least partially enclosing the first end of the frame. The first and second UVC radiation sources are positioned in the housing.

In some embodiments, the housing is formed of a UVC blocking material.

In some embodiments, the disinfection system further includes a nitrogen blow-wash system positioned in the housing and configured to apply nitrogen gas to the at least one medical garb before the UVC radiation exposure.

In some embodiments, the disinfection system further includes an exhaust system configured to maintain a predetermined level of nitrogen gas in the housing.

In some embodiments, the at least one medical garb is tautly mounted to the at least one vertical band such that at least 70% of the outer surface is exposed to UVC radiation emitted from the first UVC radiation source and at least 70% of the inner surface is exposed to UVC radiation emitted from the second UVC radiation source.

In some embodiments, the at least one medical garb is tautly mounted to the at least one vertical band such that at least 80% of the outer surface is exposed to UVC radiation emitted from the first UVC radiation source and at least 80% of the inner surface is exposed to UVC radiation emitted from the second UVC radiation source.

In some embodiments, the at least one medical garb is tautly mounted to the at least one vertical band such that at least 90% of the outer surface is exposed to UVC radiation emitted from the first UVC radiation source and at least 90% of the inner surface is exposed to UVC radiation emitted from the second UVC radiation source.

In some embodiments, the at least one vertical band is formed of a UVC transparent material.

In some embodiments, the at least one medical garb is a mask.

In some embodiments, the mask further includes a first strap at a first end of the mask and a second strap at a second end of the mask. The first strap is mounted to a first of the at least one vertical band and the second strap is mounted to a second of the at least one vertical band such that the mask is tautly mounted between the first vertical band and the second vertical band.

In some embodiments, the first UVC radiation source and the second UVC radiation source are configured to expose the at least one medical garb to a UVC radiation dose of up to about 1.5 J/cm$^2$.

In some embodiments, the disinfection system further includes a control unit for powering and controlling the first UVC radiation source, the second UVC radiation source, and the motor.

According to another embodiment of the present technology, a disinfection system including a frame and a housing partially enclosing a first end of the frame is provided. At least one pair of opposing Ultraviolet-C ("UVC") radiation sources are positioned in the housing. Each UVC radiation source of the at least one pair of opposing UVC radiation sources are separated by a gap and configured to emit UVC radiation into the gap toward the other opposing UVC radiation source. An upper conveyor track is positioned adjacent a top of the frame and partially located in the gap between the at least one pair of opposing UVC radiation sources. A lower conveyor track is positioned adjacent a bottom of the frame and partially located in the gap between the at least one pair of opposing UVC radiation sources. The disinfection system further includes at least one mask mounting system. The at least one mask mounting system includes an upper support member connected to the upper conveyor track, a lower support member connected to the lower conveyor track, a first vertical band connected to a first end of the upper support member and a first end of the lower support member, and a second vertical band connected to a second end of the upper support member and a second end of the lower support member. At least one mask is mounted to the at least one mas mounting system. The at least one mask includes a body, a first strap at a first end of the body, and a second strap at a second end of the body. The first strap is mounted to the first vertical band and the second strap is mounted to the second vertical band such that the mask is tautly mounted between the first vertical band and the second vertical band. A motor is configured to simultaneously drive the upper conveyor track and the lower conveyor track such that the at least one mask is translated through the gap between the at least one pair of opposing UVC radiation sources such that an outer surface and an inner surface of the body of the mask are simultaneously exposed to UVC radiation emitted by the at least one pair of opposing UVC radiation sources. A control unit for powering and controlling the at least one pair of opposing UVC radiation sources and the motor is included.

In some embodiments, the at least one pair of opposing UVC radiation sources includes at least one mercury vapor lamp, at least one UVC light emitting diode, or combinations thereof.

In some embodiments, the at least one mask mounting system is formed of a UVC transparent material.

In some embodiments, the housing is formed of a UVC blocking material.

In some embodiments, the at least one mask is tautly mounted between the first vertical band and the second vertical band such that at least 90% of the body of the at least one mask is exposed to UVC radiation emitted by the at least one pair of opposing UVC radiation sources.

According to another embodiment of the present technology, a method of disinfecting medical garbs is provided. The method includes the steps of: providing a medical garb for disinfection; providing an upper conveyor track positioned adjacent a top portion of a frame; providing a lower conveyor track positioned adjacent a bottom portion of a frame; providing a pair of opposing Ultraviolet-C ("UVC") radiation sources separated by a gap and configured to emit UVC radiation into the gap toward one another, the pair of opposing UVC radiation sources positioned such that a portion of the upper conveyor track and a portion of the lower conveyor track pass through the gap; providing a vertically-oriented medical garb mounting system including an upper support member connected to the upper conveyor track; a lower support member connected to the lower conveyor track; a first vertical band connected to a first end of the upper support member and a first end of the lower support member; and a second vertical band connected to a second end of the upper support member and a second end of the lower support member; securing a portion of a first end of the medical garb to the first vertical band; securing a portion of a second end of the medical garb to the second vertical band; driving, via a motor, the upper conveyor track and the lower conveyor track to laterally translate the vertically-oriented medical garb mounting system through the gap; and irradiating, simultaneously, an outer surface of the medical garb with UVC radiation emitted from a first of the pair of opposing UVC radiation sources and an inner surface of the medical garb with UVC radiation emitted from a second of the pair of opposing UVC radiation sources as the vertically-oriented medical garb mounting system is translated through the gap.

In some embodiments, the method further includes adjusting a distance between the first vertical band and the second vertical band such that the medical garb is tautly mounted to the vertically-oriented medical garb mounting system.

In some embodiments, the vertically-oriented medical garb mounting system is formed of a UVC transparent material.

In some embodiments, the medical garb is a mask.

Further objects, aspects, features, and embodiments of the present technology will be apparent from the drawing figures and below description.

DETAILED DESCRIPTION

The present technology is directed to a UVC radiation exposure system for disinfection purposes. Although it is most convenient to design the UVC radiation exposure system using a horizontally-oriented conveyor belt to transport contaminated FFRs under a bank of UVC radiation sources, embodiments of the present disinfection system are designed such that FFRs are exposed to UVC radiation from both the front and mount facing sides simultaneously to improve disinfection. In a traditional conveyor system, the belt material blocks and prevents much of the UVC radiation from reaching the side of the FFR that is in contact with the belt. To address this issue, embodiments of the present technology include a vertically-oriented mounting system for UVC radiation exposure where both operational surfaces (i.e. the outer and inner surfaces) of the FFR are simultaneously and efficiently dosed with UVC radiation.

Figure 1:
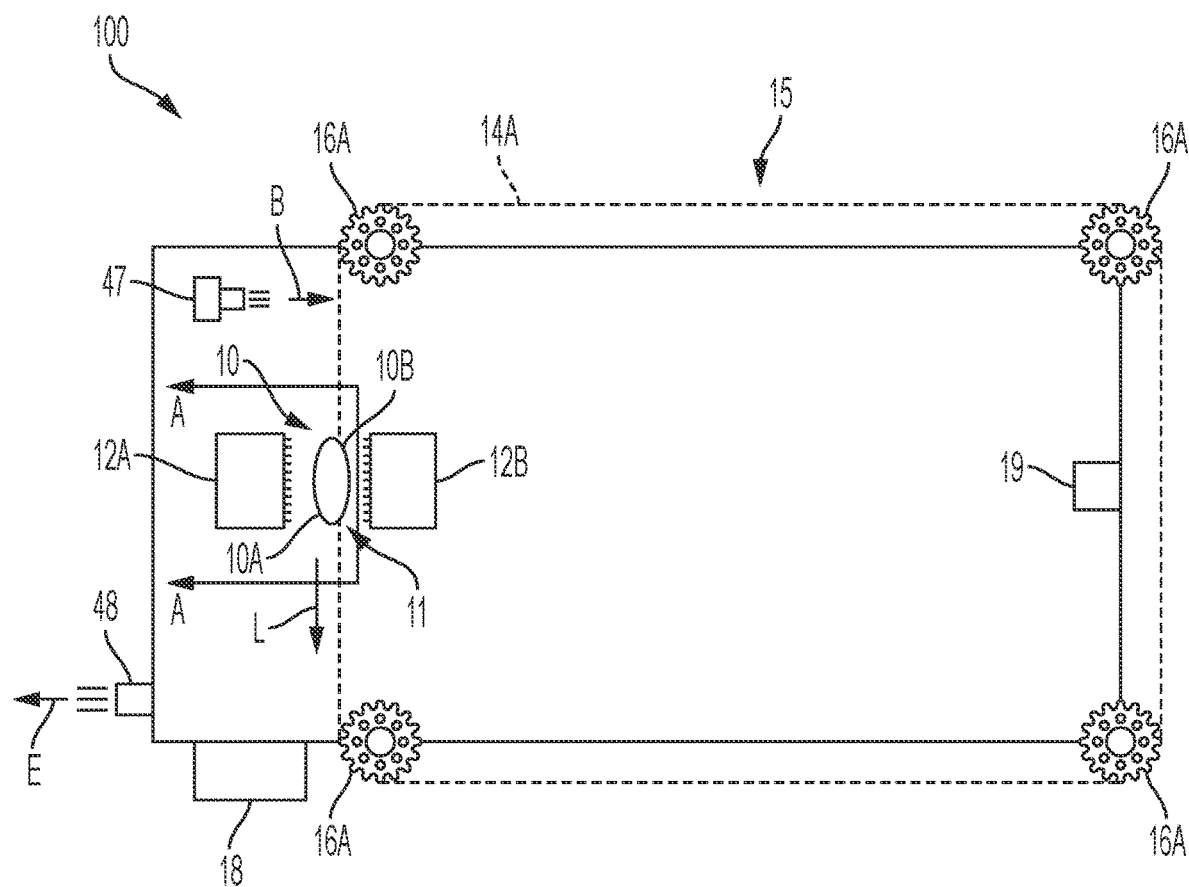
FIG. 1 is a top schematic view of a disinfection system according to an embodiment of the present technology.

FIG. 1 shows a schematic view of a disinfection system 100 according to an embodiment of the present technology. A first UVC radiation source 12A is positioned opposite a second UVC radiation source 12B such that a gap 11 is formed between the first UVC radiation source 12A and the second UVC radiation source 12B. The first UVC radiation source 12A and the second UVC radiation source 12B oppose each other such that the first UVC radiation source 12A emits UVC radiation across the gap 11 toward the second UVC radiation source 12B, and the second UVC radiation source 12B emits UVC radiation across the gap 11 toward the first UVC radiation source 12A. The arrangement of the first UVC radiation source 12A and the second UVC radiation source 12B discussed herein is also referred to as a pair of opposing UVC radiation sources. In some embodiments, a plurality of the pair of opposing UVC radiation sources 12A, 12B are used to further increase the UVC radiation exposure.

Figure 3:
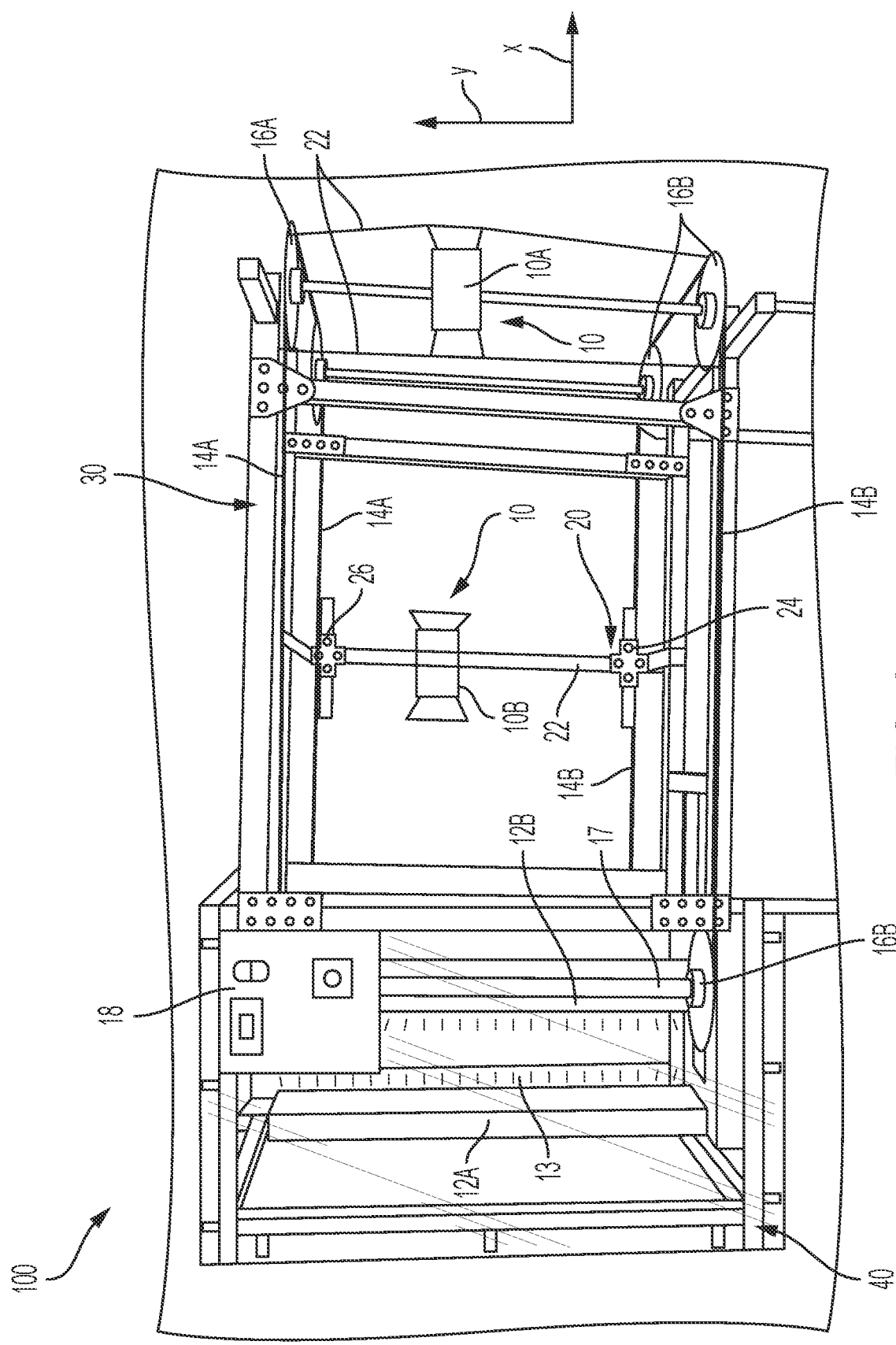
FIG. 3 is a side view of the disinfection system of FIG. 2.

In some embodiments, the disinfection system 100 includes a conveyor system 15 that is partially positioned in the gap 11. The conveyor system 15 includes an upper track 14A and a lower track 14B. Preferably, the upper track 14A and the lower track 14B are vertically stacked parallel with a vertical axis Y of the system 100, as shown in FIG. 3. In some embodiments, the upper track 14A has a plurality of perforations or indentations (e.g., a chain) for engaging with a plurality of upper sprockets 16A positioned adjacent peripheral edges of a frame 30 that supports the system 100. In some embodiments, the lower track 14B has a plurality of perforations or indentations (e.g., a chain) for engaging with a plurality of lower sprockets 16B positioned adjacent peripheral edges of the frame 30. Preferably, each upper sprocket 16A is connected to a lower sprocket 16B by an axle 17 that is parallel with the vertical axis Y forming a sprocket assembly, as shown in FIG. 3. Thus, the conveyor system 15 is vertically-oriented such that an object conveyed or translated by the conveyor system 15 is suspended vertically between the upper track 14A and the lower track 14B. In some embodiments, the conveyor system 15 includes a motor 19 configured to simultaneously drive the upper track 14A and the lower track 14B.

As shown in FIG. 1, a portion of the upper track 14A and a portion of the lower track 14B passes through the gap 11 between the first UVC radiation source 12A and the second UVC radiation source 12B such that a contaminated object 10 is conveyed or translated laterally along the direction line L by the conveyor system 15 through the gap 11 for UVC radiation exposure. In some embodiments, the contaminated object 10 is a medical garb, such as a PPE or FFR. In some embodiments, the contaminated object 10 is a mask, such as an N95 medical mask. The mask 10 includes a body having an outer surface 10A, an inner surface 10B, a first end 10C, and a second end 10D. A strap 11 (e.g., an elastomer strap for wrapping around a user's ears when wearing the mask 10) is positioned on each of the first end 10C and the second end 10D. Preferably, the mask 10 is vertically mounted to the conveyor system 15 such that the outer surface 10A is exposed to UVC radiation emitted from the first UVC radiation source 12A and the inner surface 10B is simultaneously exposed to UVC radiation emitted from the second UVC radiation source 12B as the mask 10 is translated through the gap 11 between the UVC radiation sources 12A, 12B.

Figure 2:
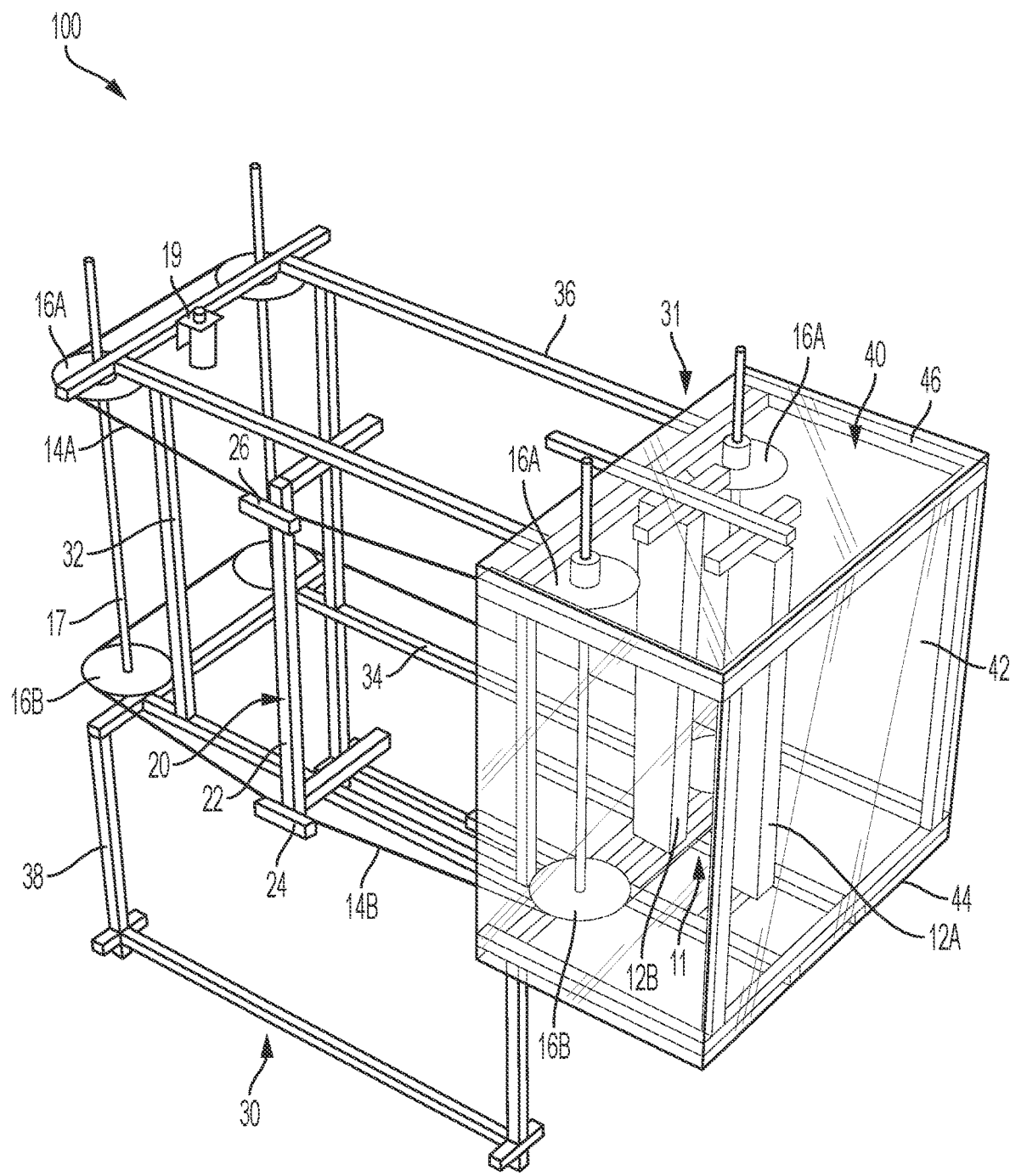
FIG. 2 is a perspective of a disinfection system according to an embodiment of the present technology.
Figure 5:
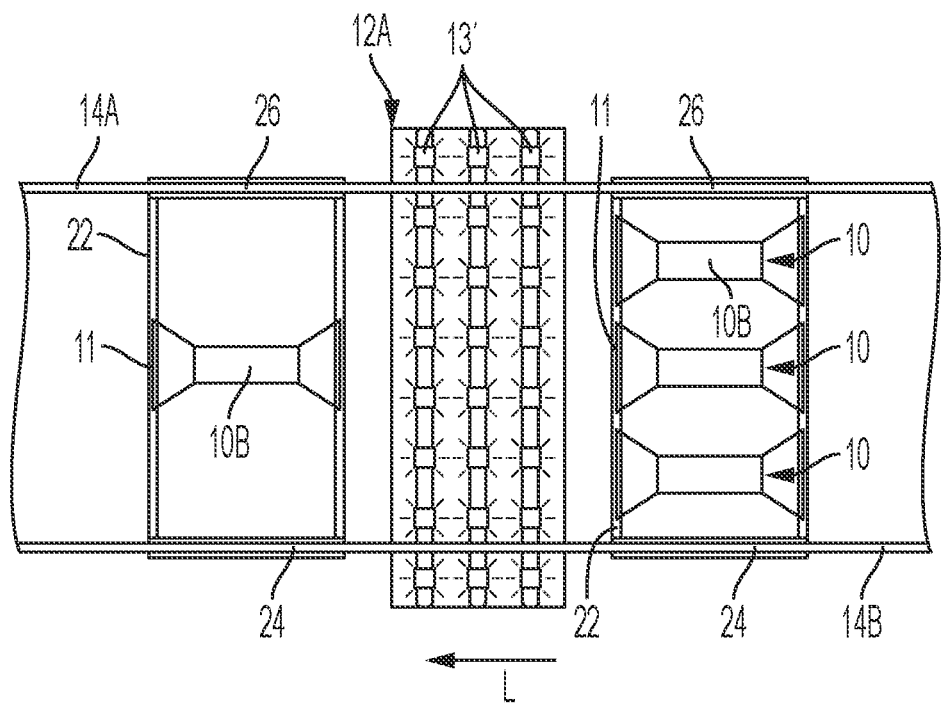
FIG. 5 is a partial cross-sectional view of a disinfection system according to an embodiment of the present technology taken along section A-A of FIG. 1.

In some embodiments, an object mounting system 20 is included for mounting the mask 10 to the conveyor system 15, as shown in FIGS. 2-3. The object mounting system 20 includes an upper support member 26 connected to the upper track 14A and a lower support member 24 connected to the lower track 14B. At least one vertical band 22 is connected to the upper support member 26 and the lower support member 24. The vertical band 22 is preferably parallel with the vertical axis Y, such that the object mounting system 20 is vertically oriented. The mask 10 is mounted to the vertical band 22 such that the outer surface 10A is exposed to UVC radiation emitted from the first UVC radiation source 12A and the inner surface 10B is simultaneously exposed to UVC radiation emitted from the second UVC radiation source 12B as the mask 10 is translated through the gap 11. In some embodiments, a plurality of masks 10 are mounted to and arranged vertically along the vertical band 22. In some embodiments, a plurality of object mounting systems 20 are included such that multiple masks 10, or multiple groupings of masks 10, can be disinfected, as shown in FIG. 3 and FIG. 5. In preferred embodiments, the at least one vertical band 22 is formed of a UVC transparent material (e.g., cyclic olefin copolymer) such that the vertical bands 22 do not inhibit the UVC radiation exposure of the mask surfaces 10A, 10B. In some embodiments, the object mounting system 20 is formed of a UVC transparent material.

Figure 4:
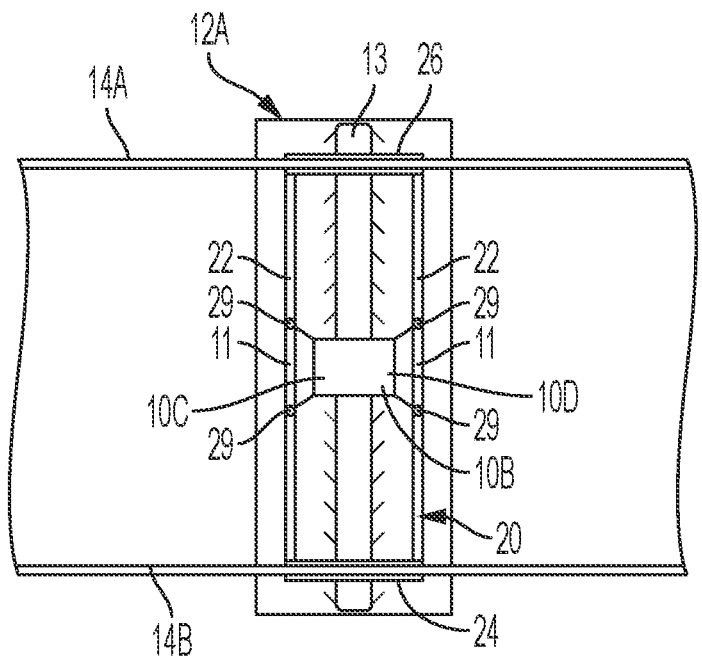
FIG. 4 is a partial cross-sectional view of a disinfection system according to an embodiment of the present technology taken along section A-A of FIG. 1.

FIG. 4 shows a partial cross-sectional view of the disinfection system 100 along section A-A of FIG. 1. As shown, the object mounting system 20 includes two vertical bands 22 spaced apart such that the mask 10 is suspended between the vertical bands 22 with one strap 11 mounted to one vertical band 22 and the other strap 11 mounted to the other vertical band 22. Preferably, the straps 11 are mounted to the vertical bands 22 that are spaced apart a distance such that the body of the mask 10 is suspended or mounted tautly along the vertical axis Y and a horizontal axis X. In some embodiments, the vertical bands 22 are spaced apart a variable distance such that users can adjust the distance between the vertical bands 22 for tautly mounting the straps 11 to the vertical bands 22. In some embodiments, the vertical bands 22 are connected directly to the upper track 14A and the lower track 14B, as shown FIG. 3. In some embodiments, the straps 11 are mounted to the vertical bands 22 using mounting members 29, such as pegs, clips, ties, etc., as shown in FIG. 4. In some embodiments, the straps 11 are tied around the vertical bands 22. Tautly mounting the mask 10 reduces the amount of shadowed areas and increases the amount of surface area exposure to UVC radiation, thus increasing the efficacy of the disinfection system 10. In some embodiments, the mask 10 is tautly mounted to the object mounting system 20 such that at least 60% of the outer surface 10A is exposed to UVC radiation emitted from the first UVC radiation source 12A and at least 60% of the inner surface 10B is exposed to UVC radiation emitted from the second UVC radiation source 12B. In some embodiments, the mask 10 is tautly mounted to the object mounting system 20 such that at least 70% of the outer surface 10A is exposed to UVC radiation emitted from the first UVC radiation source 12A and at least 70% of the inner surface 10B is exposed to UVC radiation emitted from the second UVC radiation source 12B. In some embodiments, the mask 10 is tautly mounted to the object mounting system 20 such that at least 80% of the outer surface 10A is exposed to UVC radiation emitted from the first UVC radiation source 12A and at least 80% of the inner surface 10B is exposed to UVC radiation emitted from the second UVC radiation source 12B. In some embodiments, the mask 10 is tautly mounted to the object mounting system 20 such that at least 90% of the outer surface 10A is exposed to UVC radiation emitted from the first UVC radiation source 12A and at least 90% of the inner surface 10B is exposed to UVC radiation emitted from the second UVC radiation source 12B.

In some embodiments, the first UVC radiation source 12A and/or the second UVC radiation source 12B emit UVC radiation via a mercury vapor lamp 13, as shown in FIG. 4. In some embodiments, the first UVC radiation source 12A and/or the second UVC radiation source 12B emit UVC radiation via a plurality of UVC light emitting diodes ("LEDs") 13', as shown in FIG. 5. In some embodiments, the UVC radiation sources 12A, 12B are configured to expose contaminated masks 10 to UVC dose levels that are sufficient for the disinfection of FFRs, such as of up to about 1.5 $J/cm^2$. In some embodiments, the disinfection system 100 includes a control unit 18 configured to power and control the UVC radiation sources 12A, 12B and the motor 19.

Preferably, the motor is configured to drive the conveyor system 15 at speeds that provide sufficient UVC exposure time to the masks 10 to achieve disinfection and permit users to easily mount and dismount masks 10 from the conveyor system 15 while in motion. In some embodiments, the motor 19 uses variable speeds for UVC dose control.

In some embodiments, the frame 30 includes at least one top member 36, at least one bottom member 34, and at least one side member 32 connecting the top members 36 to the bottom members 34, as shown in FIG. 2. In some embodiments, the frame 30 includes at least one leg members 38 connected to the bottom members 34. In some embodiments, the UVC radiation sources 12A, 12B are positioned at a first end 31 of the frame 30. In some embodiments, the frame 30 has a rectangular cross-sectional shape and one sprocket assembly (as discussed above) positioned adjacent each corner of the frame 30, as shown in FIG. 1.

In some embodiments, a chamber or housing 40 partially encloses the first end 31 of the frame 30 such that the UVC radiation sources 12A, 12B are located within the housing 40, as shown in FIGS. 2-3. The housing 40 has a top 46, a bottom 44, and a plurality of walls 42 connecting the top 46 to the bottom 44. In some embodiments, the housing 40 is formed of a UVC blocking material (e.g., polycarbonate) to generally keep the UVC radiation contained within the housing 40. In some embodiments, the UVC blocking material is transparent to visible light for clear indication that the UVC radiation sources 12A, 12B are functioning properly.

In some embodiments, a blow-wash system 47 is located within the housing 40, as shown in FIG. 1. The blow-wash system is configured to blow nitrogen gas toward and apply nitrogen gas to the masks 10 upon entering the housing 40, as indicated by direction line B in FIG. 1. In some embodiments, the mask 10 is oxidized during UVC radiation exposure. In some embodiments, the blow-wash system 47 blows nitrogen gas at a sufficient velocity against the masks 10 entering the housing 40 to remove air from the masks 10 and limit the oxidation (by removing $O_2$ from the mask 10) during UVC radiation exposure. In some embodiments, an exhaust system 48 is located in the housing 40 to remove excess nitrogen gas from the UVC radiation exposure region (e.g., the gap 11 between the pair of opposing UVC radiation sources 12A, 12B) and to keep normal air/oxygen levels in the area outside the UVC radiation exposure region (e.g., areas within the housing 40 and located outside the gap 11). In some embodiments, the exhaust system 48 expels air from the housing 40 as indicated by direction line E in FIG. 1.

In some embodiments, the blow-wash system 47 includes ozone from a suitable ozone generator added to the nitrogen gas to provide additional disinfection capabilities and to remove other foreign organic materials in or on the mask surfaces 10A, 10B, 11. In some embodiments, the blow-wash system 47 combines ozone and vapor hydrogen peroxide in suitable concentrations to ensure cleaning and disinfection of the mask 10 in addition to that achieved by UVC radiation exposure. In some embodiments, the blow-wash system 47 uses clean, dry air. In some embodiments, the blow-wash system 47 is used without UVC radiation exposure, in which cases the concentrations of ozone and/or vapor hydrogen peroxide are adjusted to achieve the desired level of disinfection and cleanliness. In some embodiments, the blow-wash system 47 has a similar structure to the commercially-available air blade hand dryers where the nitrogen gas and/or air velocity is adjusted to push the gas emitted by the air blade through the mask 10 without applying too much force or dislodging the mask 10 from the mounting system 20.

Although the technology has been described and illustrated with respect to exemplary embodiments thereof, it should be understood by those skilled in the art that the foregoing and various other changes, omissions, and additions may be made therein and thereto, without parting from the spirit and scope of the present technology.

What is claimed is:

1. A disinfection system, comprising:
a first Ultraviolet-C ("UVC") radiation source;
a second UVC radiation source opposing the first UVC radiation source positioned such that a gap exists between the first UVC radiation source and the second UVC radiation source, wherein the first UVC radiation source is configured to emit UVC radiation across the gap toward the second UVC radiation source and the second UVC radiation source is configured to emit UVC radiation across the gap toward the first UVC radiation source;
a vertically-oriented conveyor system partially positioned in the gap, the vertically-oriented conveyor system comprising:
at least one vertical band; and
a motor configured to translate the at least one vertical band through the gap between the first UVC radiation source and the second UVC radiation source; and
wherein the at least one vertical band is configured to have at least one medical garb mounted to it such that when the at least one vertical band is translated through the gap an outer surface of the at least one medical garb is exposed to UVC radiation emitted from the first UVC radiation source and an inner surface of the at least one medical garb is exposed to UVC radiation emitted from the second UVC radiation source.

2. The disinfection system of claim 1, wherein the first UVC radiation source and the second UVC radiation source each comprise at least one mercury vapor lamp.

3. The disinfection system of claim 1, wherein the first UVC radiation source and the second UVC radiation source each comprises a plurality of UVC light emitting diodes.

4. The disinfection system of claim 1, further comprising a frame supporting the first UVC radiation source, the second UVC radiation source, and the vertically-oriented conveyor system; wherein the first UVC radiation source and the second UVC radiation source are positioned at a first end of the frame.

5. The disinfection system of claim 4, further comprising a housing at least partially enclosing the first end of the frame; wherein the first UVC radiation source and the second UVC radiation source are positioned in the housing.

6. The disinfection system of claim 5, wherein the housing is formed of a UVC blocking material.

7. The disinfection system of claim 5, further comprising a nitrogen blow-wash system positioned in the housing and configured to apply nitrogen gas to the at least one medical garb before the UVC radiation exposure.

8. The disinfection system of claim 7, further comprising an exhaust system configured to maintain a predetermined level of nitrogen gas in the housing.

9. The disinfection system of claim 1, wherein the at least one vertical band is formed of a UVC transparent material.

10. The disinfection system of claim 1, wherein the at least one medical garb is a mask.

11. The disinfection system of claim 1, wherein the first UVC radiation source and the second UVC radiation source are configured to expose the at least one medical garb to a UVC radiation dose of up to about 1.5 J/cm$^2$.

12. The disinfection system of claim 1, further comprising a control unit for powering and controlling the first UVC radiation source, the second UVC radiation source, and the motor.

13. The disinfection system of claim 1, wherein the vertically-oriented conveyer system further comprises:
   a plurality of upper sprockets connected by an upper track;
   a plurality of lower sprockets connected by a lower track; and
   wherein the at least one vertical band is connected to the upper track and the lower track; and
   wherein the motor is configured to simultaneously drive the upper track and the lower track to translate the at least one vertical band.

14. A disinfection system, comprising:
   a frame;
   a housing partially enclosing a first end of the frame;
   at least one pair of opposing Ultraviolet-C ("UVC") radiation sources positioned in the housing, each UVC radiation source of the at least one pair of opposing UVC radiation sources being separated by a gap and configured to emit UVC radiation into the gap toward the other opposing UVC radiation source;
   an upper conveyor track positioned adjacent a top of the frame and partially located in the gap between the at least one pair of opposing UVC radiation sources;
   a lower conveyor track positioned adjacent a bottom of the frame and partially located in the gap between the at least one pair of opposing UVC radiation sources;
   at least one mask mounting system comprising:
      an upper support member connected to the upper conveyor track;
      a lower support member connected to the lower conveyor track;
      a first vertical band connected to a first end of the upper support member and a first end of the lower support member; and
      a second vertical band connected to a second end of the upper support member and a second end of the lower support member;
   a motor configured to simultaneously drive the upper conveyor track and the lower conveyor track such that the first vertical band and the second vertical band are translated through the gap between the at least one pair of opposing UVC radiation sources; and
   a control unit for powering and controlling the at least one pair of opposing UVC radiation sources and the motor.

15. The disinfection system of claim 14, wherein the at least one pair of opposing UVC radiation sources comprises at least one mercury vapor lamp, at least one UVC light emitting diode, or combinations thereof.

16. The disinfection system of claim 14, wherein the at least one mask mounting system is formed of a UVC transparent material.

17. The disinfection system of claim 14, wherein the housing is formed of a UVC blocking material.

18. The disinfection system of claim 14, further comprising at least one mask mounted to the at least one mask mounting system, the at least one mask comprising a body, a first strap at a first end of the body, and a second strap at a second end of the body, wherein the first strap is mounted to the first vertical band and the second strap is mounted to the second vertical band such that the mask is tautly mounted between the first vertical band and the second vertical band; and
   wherein an outer surface and an inner surface of the body of the mask are simultaneously exposed to UVC radiation emitted by the at least one pair of opposing UVC radiation sources when the first vertical band and the second vertical band are translated through the gap.

19. A method of disinfecting medical garbs, the method comprising the steps of:
   providing a medical garb for disinfection;
   providing an upper conveyor track positioned adjacent a top portion of a frame;
   providing a lower conveyor track positioned adjacent a bottom portion of a frame;
   providing a pair of opposing Ultraviolet-C ("UVC") radiation sources separated by a gap and configured to emit UVC radiation into the gap toward one another, the pair of opposing UVC radiation sources positioned such that a portion of the upper conveyor track and a portion of the lower conveyor track pass through the gap;
   providing a vertically-oriented medical garb mounting system, comprising:
      an upper support member connected to the upper conveyor track;
      a lower support member connected to the lower conveyor track;
      a first vertical band connected to a first end of the upper support member and a first end of the lower support member; and
      a second vertical band connected to a second end of the upper support member and a second end of the lower support member;
   securing a portion of a first end of the medical garb to the first vertical band;
   securing a portion of a second end of the medical garb to the second vertical band;
   driving, via a motor, the upper conveyor track and the lower conveyor track to laterally translate the vertically-oriented medical garb mounting system through the gap; and
   irradiating, simultaneously, an outer surface of the medical garb with UVC radiation emitted from a first of the pair of opposing UVC radiation sources and an inner surface of the medical garb with UVC radiation emitted from a second of the pair of opposing UVC radiation sources as the vertically-oriented medical garb mounting system is translated through the gap.

20. The method of disinfecting medical garbs of claim 19, further comprising adjusting a distance between the first vertical band and the second vertical band such that the medical garb is tautly mounted to the vertically-oriented medical garb mounting system.

21. The method of disinfecting medical garbs of claim 19, wherein the vertically-oriented medical garb mounting system is formed of a UVC transparent material.

22. The method of disinfecting medical garbs of claim 19, wherein the medical garb is a mask.

* * * * *